United States Patent [19]
Woltman

[11] Patent Number: 5,085,678
[45] Date of Patent: Feb. 4, 1992

[54] EXHAUST GASES AND PARTICULATE CAPTURE SYSTEM

[76] Inventor: Robert B. Woltman, 213 N. Second St., Barstow, Calif. 92311

[21] Appl. No.: 644,899

[22] Filed: Jan. 22, 1991

[51] Int. Cl.⁵ ............................................. B01D 47/10
[52] U.S. Cl. ..................................... 55/227; 55/255; 55/256; 55/257.1; 261/DIG. 75
[58] Field of Search .................... 55/95, 227, 242, 255, 55/256, 223, 257.1, 229; 261/DIG. 75

[56] References Cited

U.S. PATENT DOCUMENTS

| | | |
|---|---|---|
| 943,422 | 12/1909 | Knoepfel . |
| 980,257 | 1/1911 | Heslewood . |
| 1,128,177 | 2/1915 | Moser . |
| 2,090,994 | 8/1937 | Brandes ................................. 261/121 |
| 2,684,231 | 2/1952 | Pomykala ............................... 261/21 |
| 3,517,485 | 6/1970 | Dell'Agnese et al. ............. 55/227 X |
| 3,704,570 | 12/1972 | Gardenier .......................... 55/223 X |
| 3,768,234 | 10/1973 | Hardison ............................... 55/223 |
| 3,884,653 | 5/1975 | Capilli et al. ........................... 55/223 |
| 4,057,602 | 11/1977 | Kolm .................................. 261/220 |
| 4,226,719 | 10/1980 | Woltman ............................. 210/220 |
| 4,308,138 | 12/1981 | Woltman ............................. 210/220 |
| 4,437,867 | 3/1984 | Lerner ................................ 55/242 X |
| 4,936,878 | 6/1990 | Gustavsson et al. ................ 55/95 X |

Primary Examiner—Charles Hart
Attorney, Agent, or Firm—Quirk, Tratos & Roethel

[57] ABSTRACT

An exhaust gases and particulate capture system comprises an aspirator unit and a secondary stack mounted in fluid cooperation with a large water tank. Exhaust gases, along with entrapped particulates from the combustion process, are removed from a smokestack and are introduced into the aspirator unit and mixed with water from the tank. The gases and particulates are blended with the water in the mixing chamber of the aspirator which churns the gases, particulates and water into a very turbulent condition. The resulting mixture is discharged from the aspirator through an entrainment nozzle into the water tank. The design of the exit end of the entrainment nozzle effects a sweeping motion to the mixture being discharged ensuring that the mixture is discharged over the entire width of the tank holding the water. The exhaust gases and entrapped particulates are cooled and condensed in the water tank and the particulates settle down to the bottom of the tank. A positive gas pressure over the top of the water in the tank keep the exhaust gases from escaping to the atmosphere. Baffles are provided between the aspirator unit and the secondary stack to quiet the water flowing into the region of the secondary stack. The exhaust gases leaving the secondary stack to the outside atmosphere are free from pollutants and particulate matter.

20 Claims, 6 Drawing Sheets

EXHAUST GASES AND PARTICULATE CAPTURE SYSTEM

This invention relates to an exhaust gases and particulate capture system, and more particularly to an exhaust gases and particulate capture system that directs exhaust gases into an aspirator and then through a water tank and filter screening tower resulting in the substantial capture of all the particulates in the exhaust gases.

BACKGROUND OF THE INVENTION

Environmental pollution has become a serious problem not only in the United States, but also throughout the world. The combustion of fossil fuels to generate energy results in the exhaust gases containing harmful by-products of the combustion process. The exhaust gases contain small particulate matter remaining from the incomplete combustion of the fossil fuel. Typical exhaust gases contain nitrogen oxides, carbon monoxides, sulfur dioxides, carbon particulates, fly ash and magnesium sulfites.

Traditionally smokestacks of extended heights have been used to disperse the exhaust gases with the entrapped particulates directly into the atmosphere. This method achieved the desired result of relieving the area immediately adjoining the fossil fuel energy plant from the deleterious exhaust gases, but the exhaust gases and particulates were simply dispersed by the wind to the neighboring communities.

Eventually governmental restrictions, including the ability to impose substantial monetary fines, were enacted limiting the amount of particulates that could be emitted in the exhaust gases leaving the fossil fuel combustion apparatus. Many techniques have been proposed to control the particulate emission. Most prevalent is the use of an electrostatic precipitator (ESP) in the smokestack or other exhaust gas conduit.

However, one of the drawbacks of fitting a smokestack with an ESP is the large amount of energy that is required just to operate the ESP. ESP technology is also quite complicated and sensitive, requiring constant monitoring and close operational control to ensure that the ESP works correctly and effectively.

In current exhaust gas treatment technology, water is often sprayed into the exhaust gases prior to the beginning of the flow of the exhaust gases up the smokestack. This addition of water is used to try and scrub the particulates out of the exhaust gases. Typically, a bank of horizontal sprayers are disposed in a treatment chamber to spray the exhaust gases with either water or a water and lime mixture. This treatment chamber must be designed to include water sprays at the appropriate locations in the chamber and apparatus must also be included to collect the particulates removed from the exhaust gases as well as any excess water or lime from the process. Spraying water into the flow of the exhaust gases has not proven to be an efficient method of treatment because there is no way of ensuring that all of the particulates entrapped in the exhaust gases can be brought into contact with the water.

At least as early as 1911, it was proposed to take exhaust gases from a smelting furnace and force these gases through a body of water to precipitate and condense the volatile materials in the exhaust gas. Representative of such a proposal is U.S. Pat. No. 980,257 to Heslewood.

Heslewood discloses a fume condensing apparatus for use with a smelting furnace A. A series of exhaust vents 5 are disposed around the upper end of the furnace and the exhaust vents are connected by a manifold assembly 6 to an exhaust line 6'. The exhaust line 6' terminates in a bell-shaped suction chamber 7. A pump 14 has a nozzle 9 that also feeds into the suction chamber 7. A contracted throat 10 exits the suction chamber and is connected to a perforated pipe 12 that is disposed at the lower end of a tank 11 containing water.

In operation, Heslewood's apparatus withdraws water from the tank 11 and forces it at high pressure and velocity through the nozzle 9. The water passes through the suction chamber 7 and into the contracted throat 10 which creates a vacuum in the suction chamber 7. This vacuum draws gases and fumes from the smelting furnace A through the exhaust vents 5, through the manifold assembly 6 and exhaust line 6' into the suction chamber 7. The gases and fumes eventually are distributed by the perforated pipe 12 into the water in the tank 11. The water causes the gases and fumes to cool and condense. Precipitates fall to the bottom of the tank 11 where they may be collected and subsequently removed.

The Heslewood apparatus does not efficiently mix the intake water with the gases and fumes withdrawn from the smelting furnace. The gases and fumes injected into the water tank are not dispersed throughout the entire water body but rather are centralized in the water immediately adjacent the perforated pipe. The perforated pipe also has the tendency to become clogged thereby inhibiting the efficiency of the apparatus. The resulting exhaust gases that bubble up through the water in the tank may still contain harmful contaminants that are released into the atmosphere.

It is an object of the present invention to provide an exhaust gases and particulate capture system that simply and efficiently removes particulate matter from exhaust gases.

It is a feature of the present invention to utilize a highly efficient aspirator to mix exhaust gases with water and to pump this mixture at high speed into a tank of water where the particulates can precipitate and collect on the bottom of the tank. A positive pressure is maintained above the water level to prevent contaminated gases from escaping. Baffles are provided to quiet the turbulent water flow in the tank and a secondary screening tower is provided to clean the exhaust gases prior to these gases being vented to the atmosphere.

It is an advantage of the present invention that exhaust gases from furnaces can be cleaned of particulates and other harmful contaminants in an efficient and inexpensive manner at a cost significantly less than is incurred from the use of modern electrostatic precipitators.

SUMMARY OF THE INVENTION

An exhaust gases and particulate capture system comprises a aspirator unit mounted in the side of a large water tank. Exhaust gases, along with entrapped particulates from the combustion process, are removed from a smokestack and are introduced into the aspirator along with a supply of water. When the gases and particulates enter the aspirator, a scrubbing process begins. The gases and particulates are blended with the water in the mixing chamber of the aspirator. This blending churns the gases, particulates and water into a very turbulent condition.

As the mixture leaves the mixing chamber of the aspirator, it passes into an entrainment nozzle. To this mixture is added additional water drawn into the entrainment nozzle through two orifices in the side of the entrainment nozzle. This resulting mixture is discharged into the tank containing water. The design of the exit end of the entrainment nozzle effects a sweeping motion to the mixture being discharged ensuring that the mixture is discharged over the entire width of the tank holding the water. The exhaust gases and entrapped particulates are cooled and condensed in the water tank and the particulates settle down to the bottom of the tank. A positive gas pressure over the top of the water in the tank keep the exhaust gases from escaping to the atmosphere.

At the opposite end of the water tank from the aspirator unit, is a secondary stack fitted with a mist eliminator that filters out any final contaminants from the exhaust gases. Baffles are provided between the aspirator unit and the secondary stack to quiet the water flowing into the region of the secondary stack. The exhaust gases leaving the secondary stack to the outside atmosphere are free from pollutants and particulate matter.

Without limiting the scope of the invention, it appears that the high turbulence that occurs both inside the aspirator and at the exit end of the entrainment nozzle causes the particulate matter in the exhaust gases to break up into very small particles. An analysis of the resulting particulates that settle out onto the floor of the water tank shows particle sizes ranging from $100\mu$ down to as small as microscopic size.

The harmful non-particulate portions of the exhaust gases, such as the sulfur dioxides, combine with the water in the tank and stay in solution. This prevents sulfur or other noxious gases from being exhausted through the secondary stack to the surrounding atmosphere. The present invention is quite effective in removing those harmful exhaust gases and particulate matter that are regulated by the Environmental Protection Agency (EPA) and the cleaned exhaust gases leaving the secondary stack will meet all EPA clean air standards.

DETAILED DESCRIPTION OF THE PREFERRED EMBODIMENTS

Figure 1:
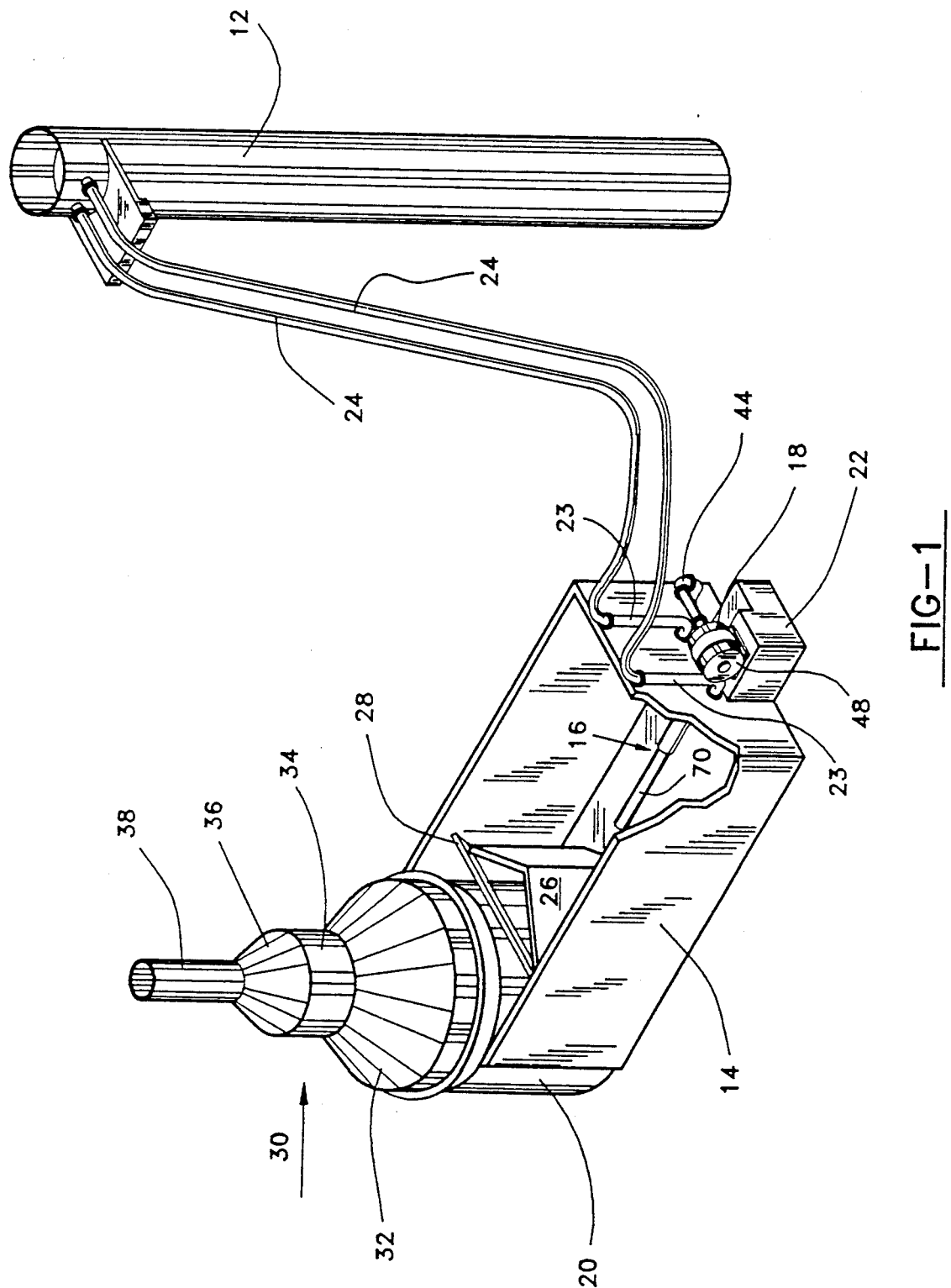
FIG. 1 shows a perspective view of the exhaust gases and particulate capture system of the present invention.
Figure 2:
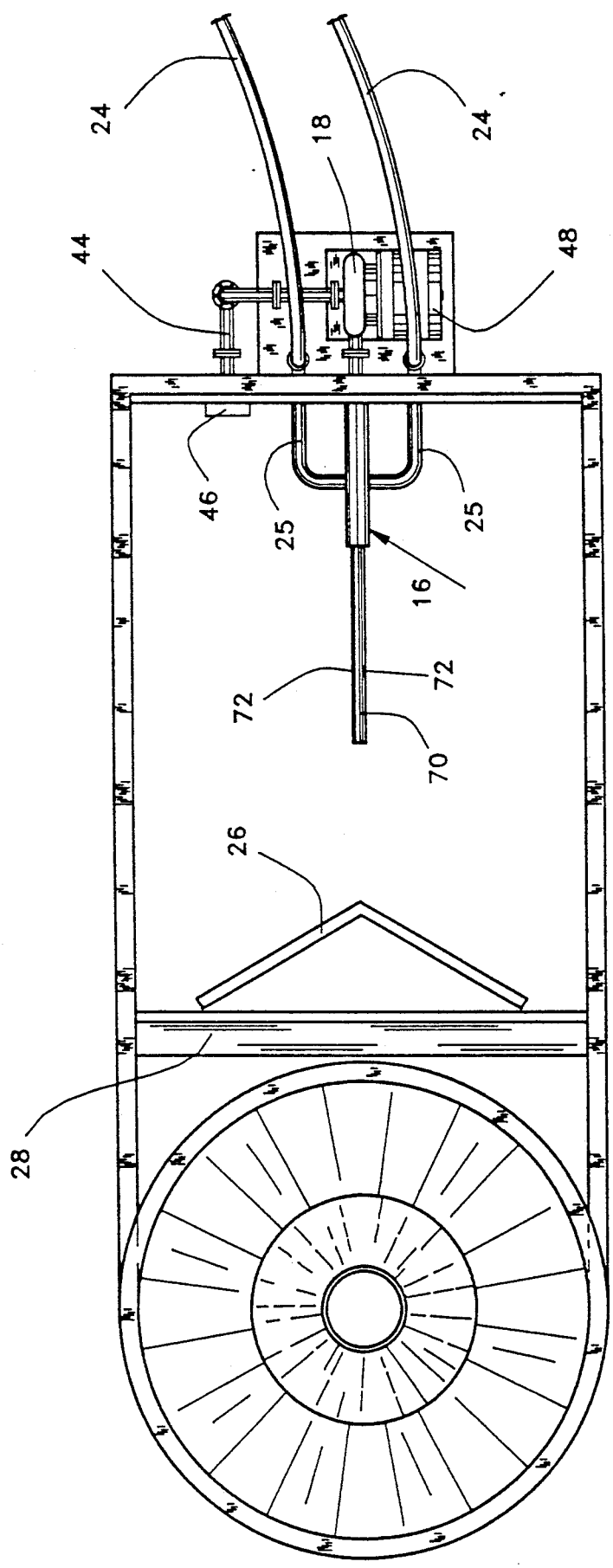
FIG. 2 shows a top view of the exhaust gases and particulate capture system of the present invention.

The exhaust gases and particulate capture system of the present invention is shown generally at 10 in the Figures. The exhaust gases and particulate capture system 10 comprises a water tank 14, preferably generally rectangular in shape. At one end of the water tank 14, an aspirator unit 16 is mounted extending inwardly into the water tank 14. The aspirator unit 16 has an entrainment nozzle 70 attached to one end thereof. On the exterior of the water tank 14 at the location adjacent the aspirator unit 16, there is provided a pump stand 22 on which is mounted a centrifugal pump 18. At the opposite end of the water tank 14 from the aspirator unit 16, a quiescent chamber 20 is provided that is in fluid communication with the interior of the tank 14. The upper end of the quiescent chamber 20 is provided with a secondary stack 30.

The complete exhaust gases and particulate capture system 10 is designed to be located on the premises of a factory or other facility in which smokestacks 12 are utilized to remove exhaust gases generated during a combustion process. Exhaust gases intake lines 24 connect the smokestack 12 with the aspirator unit 16 by means of exhaust gases intake pipes 23 and exhaust gases inlet lines 25 so that exhausts gases can be removed from the smokestack 12 and introduced into the aspirator unit 16.

The aspirator unit 16 is powered by any suitable engine or motor, such as an electric motor 48, which runs a centrifugal pump 18. The centrifugal pump 18 draws water from inside the water tank 14 through a pump intake line 44 which communicates with the interior of the water tank 14 through a water inlet 46. The centrifugal pump 18 feeds water under pressure into the entrance opening 52 of the aspirator unit 16 where it is mixed with the exhaust gases from the smokestack 12 in a manner which will be more fully explained in detail herein.

Figure 3:
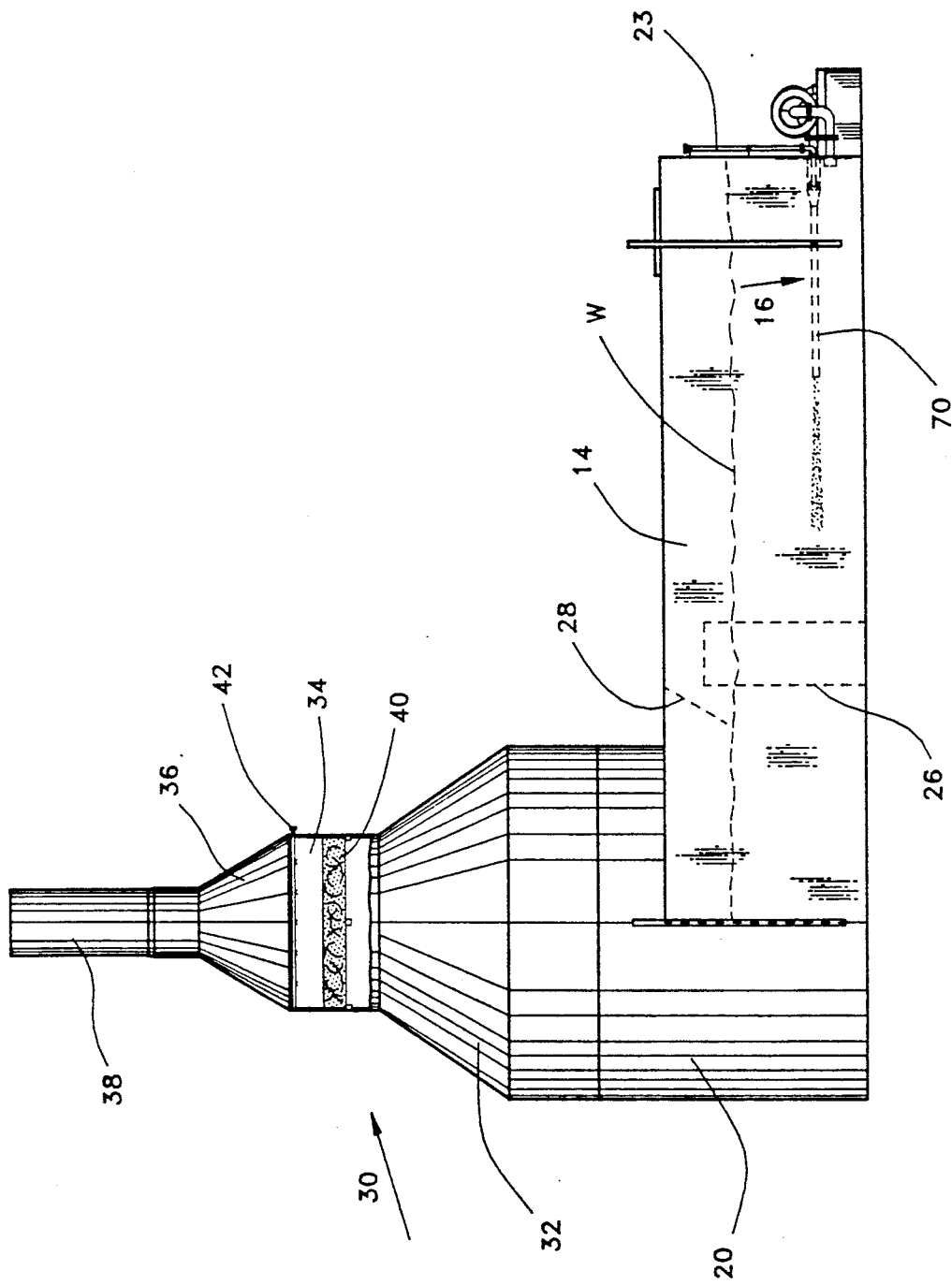
FIG. 3 shows a side view of the exhaust gases and particulate capture system of the present invention.
Figure 4:
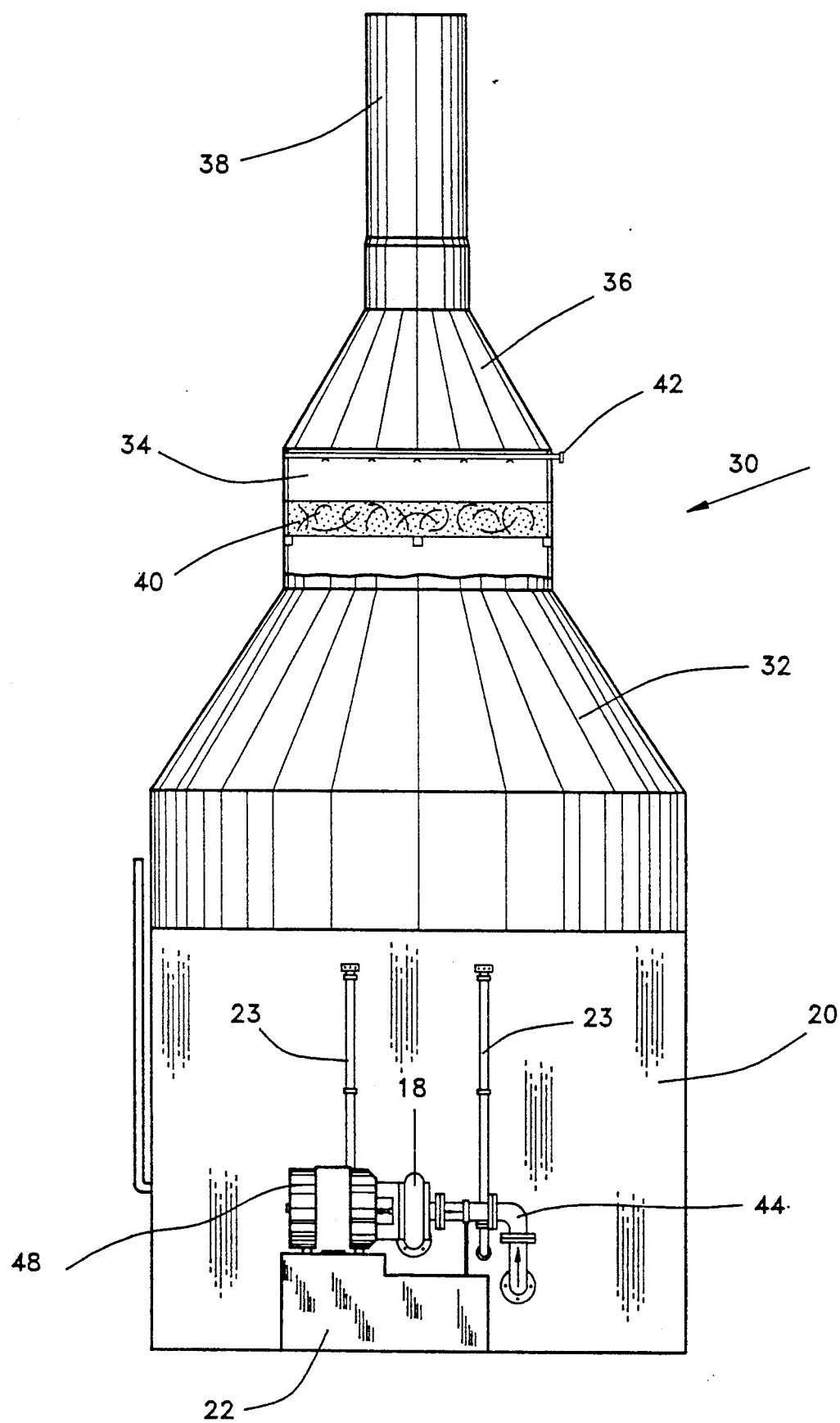
FIG. 4 shows an end view of the exhaust gases and particulate capture system of the present invention.
Figure 5:
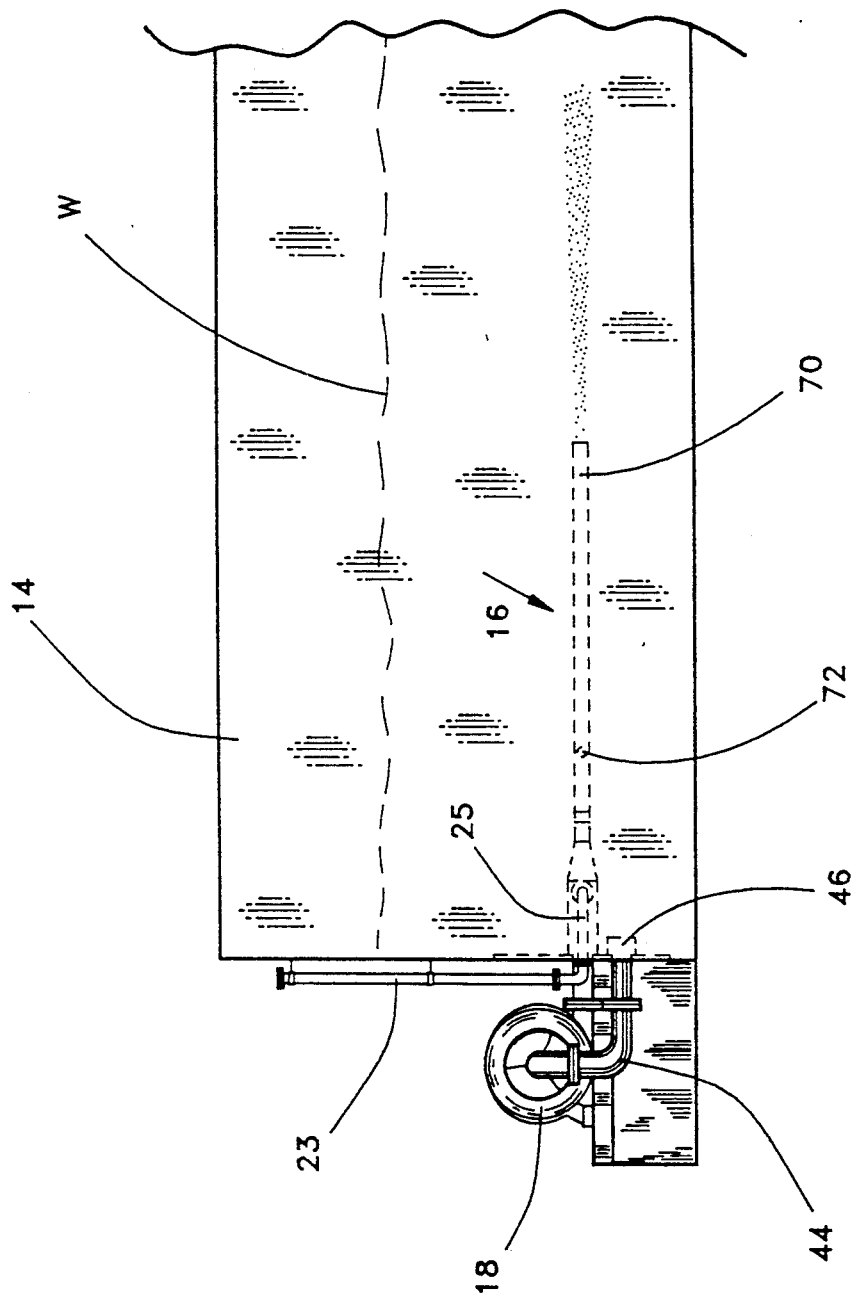
FIG. 5 shows another side view of a portion of the exhaust gases and particulate capture system of the present invention.

The water tank 14 is preferably generally rectangular in shape and is filled with water up to a level W shown in FIG. 3. The level W of the water in the water tank 14 is maintained by means of any suitable level control devices, such as a computerized sensing float and electronic high-low probes (not shown). The aspirator unit 16 is located below the level W of the water and at one end of the water tank 14.

At the opposite end of the water tank 14 a deceleration baffle 26 is provided. The deceleration baffle 26 is preferably V-shaped with the point of the V facing toward the exit end of the entrainment nozzle 70 of the aspirator unit 16. The deceleration baffle 26 acts to deflect and decelerate the flow of fluid exiting the aspirator unit 16.

Adjacent the deceleration baffle 26, there is provided a skimmer baffle 28 mounted between the side walls of the water tank 14 and depending into the water in the water tank 14 below the water level W. This skimmer baffle 28 acts to reduce the waves on the surface of the water in the water tank 14 and also acts as a skimmer to prevent passage thereby of any particulates that may be floating on the surface of the water.

The aspirator unit 16 is preferably an aspirator of the type disclosed in detail in U.S. Pat. No. 4,226,719 (Woltman) or U.S. Pat. No. 4,308,138 (Woltman), both of which are incorporated herein by this reference thereto.

Figure 6:
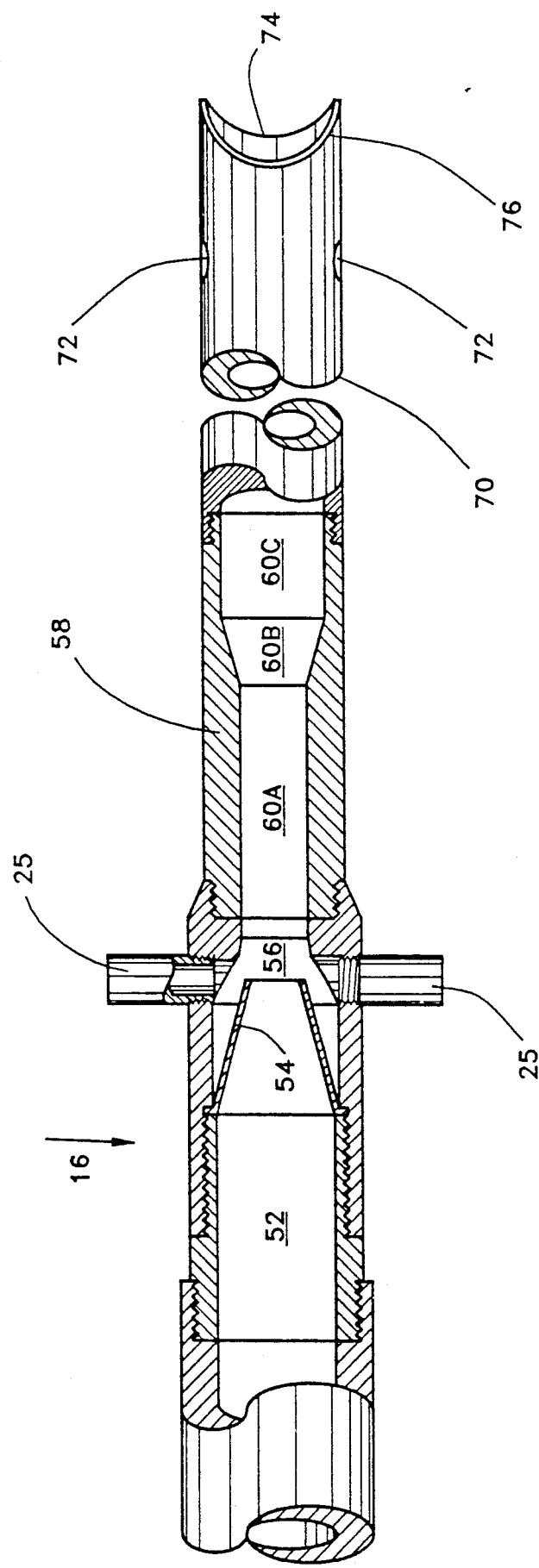
FIG. 6 shows a detailed top view, partly in section, of the aspirator unit of the exhaust gases and particulate capture system of the present invention.

The aspirator unit 16 comprises an elongated casing having a hollow passageway extending therethrough. The hollow passageway comprises a plurality of tubular sections attached together by suitable joining means, such as the screw threads shown in FIG. 6.

In use, the aspirator unit 16 receives intake water from the tank 14, mixes the intake water with exhaust gases from the smokestack 24 and disperses this combined mixture out of the end of the entrainment nozzle 70 which is connected to the end of the aspirator 16.

Water for the aspirator is drawn through water inlet 46 from the tank 14. This water is drawn through pump intake line 44 into the centrifugal pump 18 which then pumps the water into the entrance opening 52 of the aspirator unit 16. The water passes from the entrance opening 52 through a frusto-conical member 54 into a mixing chamber 56. The use of frusto-conical member 54 increases the speed of the water passing through the aspirator unit 16 and causes a partial vacuum to occur in the mixing chamber 56 which draws the exhaust gases from the smokestack 24 by way of intake lines 24, intake pipes 23 and exhaust gas inlet lines 25 into the mixing chamber 56.

Downstream of the mixing chamber 56, a barrel segment 58 contains a plurality of cylindrical chambers 60A, 60B and 60C. High turbulence is created in these cylindrical chambers 60A, 60B and 60C and a very thorough mixing and scrubbing of the exhaust gases with the water occurs. Without being bound by theory, it appears that the water impinges into the exhaust gases and breaks up the particulate matter in the exhaust gases into much smaller particle size, on the order of from $100\mu$ down to as small as microscopic size.

After this thorough mixing occurs in the cylindrical chambers 60A, 60B and 60C, the combined water and exhaust gases mixture passes into the entrainment nozzle 70 from which it is dispersed into the tank 70 below the surface W of the water in the tank 70. The entrainment nozzle 70 is preferably provided with a pair of diametrically opposed apertures 72 positioned in the wall of the entrainment nozzle prior to the exit end of the entrainment nozzle 70. Water from the tank 14 is drawn into the entrainment nozzle through these apertures 72 which results in a further increase in mixing efficiency of the water with the exhaust gases. This additional water disturbs the uniform flow of the combined water and exhaust gases mixture through the entrainment nozzle 70 and effects a further scrubbing action to the combined mixture. The additional water also creates a pulsating action to the stream of water and exhaust gases exiting the entrainment nozzle 70.

It is also preferred to provide a first beveled section 74 and a second beveled section 76 at the end of the entrainment nozzle, with one of the beveled sections being at a more acute angle than the other. This configuration results in an oscillating, side-to-side sweeping or fanning motion of the exit stream from the end of the nozzle. This provides that the exiting stream of water and exhaust gases will be dispersed across the full width of the water in the tank 14 so that the precipitation of the particulates and the dissolving of the soluble gases in the water can occur more expediently by utilizing the full volume of the water in the tank 14.

When the combined mixture is discharged from the entrainment nozzle 70, it is exiting the entrainment nozzle 70 at a velocity of preferably approximately 122 feet per second. The combined mixture is discharged into the water in the water tank 14 and as the combined mixture disperses through the water a further scrubbing and polishing action occurs removing even more particulates from the exhaust gases. Because all of the combined mixture of exhaust gases and water are discharged beneath the level W of the water in the water tank 14, any and all particulate matter contained in the combined mixture will be captured and held by the water in the water tank 14.

The water in the water tank 14 in the vicinity of the exit end of the entrainment nozzle 70 will be quite turbulent and it is desirable to quiet the movement of the water prior to the water entering into the quiescent chamber 20 and the secondary stack 30. This is done by positioning a deceleration baffle 26 in the water tank 14 adjacent the location of the quiescent chamber 20.

As shown in the drawings, the deceleration baffle 26 is preferably V-shaped with the point of the V facing the exit end of the entrainment nozzle 70. The deceleration baffle 26 is securely mounted on the floor of the water tank 14 and extends above the level W of the water, but does not extend across the entire width of the water tank 14 thereby allowing the water to flow into the area of the quiescent chamber 20. This deceleration baffle 26 divides and directs the flow of the water into the quiescent chamber 20 in a counter rotating flow pattern. The deceleration baffle 26 also slows down the rate of the flow of water toward the secondary stack 30 and directs any large particulate matter to the sides of the water tank 14. The V-shape of the deceleration baffle 26 encourages the portion of the water tank 14 behind the deceleration baffle 26 to be a calm water area.

An additional skimmer baffle 28 is disposed between the side walls of the water tank 14 and extends from the top level of the water tank 14 to a point below the level W of the water to effect both a wave reduction on the water level as well as a skimming action to the surface of the water. The skimmer baffle 28 is disposed preferably at an angle of approximately 45° to the top of the water tank 14. Two distinct advantages are accomplished by this skimmer baffle 28. The first is that any particulate matter that may become entrained in any of the bubbles floating up and breaking the surface of the water due to the heavy upwelling and turbulence created by the combined water and exhaust gases mixture exiting the entrainment nozzle 70 will be intercepted by the skimmer baffle 28 and pushed back into the water. The second is that any wave action or bubbles on the surface W of the water will be inhibited from entering the quiescent chamber 20 and possibly carried upwardly into the secondary stack 30 and the mist eliminator 40.

At the end of the water tank 14 remote from the aspirator unit 16, a quiescent chamber 20 is mounted so that the interior of the quiescent chamber 20 is in fluid communication with the interior of the water tank 14. The quiescent chamber 20 is preferably generally circular in configuration. Above the quiescent chamber 20 is a secondary stack 30 comprising a first cone section 32 having mounted thereon a middle section 34. Above the middle section 34 is a second cone section 36 and finally a upper section 38 sits at the top of the secondary stack 30. The upper section 38 is designed to have the necessary cross-section for an effective secondary smokestack. Each of these sections are also preferably generally circular in cross-section and hollow on their interiors so that treated exhaust gases may exit the system 10 through the secondary stack 30 and out into the atmosphere.

Disposed within the entire cross-section of the middle section 34 is a conventional mist eliminator 40 and above the mist eliminator 40 is a fluid sprinkler 42 which serves two distinct functions. One function is to supply the system, and particularly the water tank 14, with make-up water that may be lost during the processing of the exhaust gases. The second function is to serve as a back flush for the mist eliminator 40.

In the preferred embodiment of the present invention, the top of the water tank 14 is provided with an air tight cover (not shown) so that a positive pressure can be maintained above the lever W of the water due to the high volume of air that is drawn into the water tank 14 by the aspirator unit 16. This positive air pressure ensures that no particulate matter can escape above the air/water interface thus preventing particulates from being drawn into the upper regions of the water in the water tank 14 but instead encourages the particulate matter to settle at the bottom of the water tank 14.

The cleaned and scrubbed exhaust gases, with all particulates having settled to the bottom of the water tank 14 and all the soluble gases having dissolved into the water in the water tank 14, now passes into the quiescent chamber 20 where they bubble up to the surface of the water and then upwardly through the various sections of the secondary stack 30. As the exhaust gases rise through the secondary stack 30, they pass through the mist eliminator 40 and up and out the second cone section 36 of the secondary stack 30 into the atmosphere. The exhaust emissions from the secondary stack 30 are now pollution and particulate matter free and meet all EPA standards for clean air.

In an alternative embodiment of the present invention, various treatment chemicals can be added to the exhaust gases and particulate capture system to assist in the removal of sulfur from the exhaust gases. In the most preferred embodiment, these treatment chemicals are added to the exhaust gases removed from the smokestack prior to the exhaust gases being introduced into the aspirator unit. This ensures thorough mixing of the treatment chemicals with the exhaust gases while the exhaust gases are passing through the aspirator unit and exiting into the water tank through the entrainment nozzle. Preferred treatment chemicals are magnesium sulfate, lime, slake lime, sodium carbonate and sodium hydroxide.

By varying the size of the water tank and depending on the number of smokestacks and the volume of exhaust gases for which treatment is desired, a plurality of aspirator units can be used in the same water tank.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A exhaust gases and particulate capture system comprising
    a) a tank containing water,
    b) an aspirator unit mounted to the tank, the aspirator unit including an entrance opening, a mixing chamber, a barrel segment and a nozzle,
    c) a pump attached to the entrance opening of the aspirator unit for introducing water into the mixing chamber of the aspirator unit,
    d) exhaust gases intake line connected to the mixing chamber of the aspirator unit for bringing exhaust gases from a smokestack to the aspirator unit whereby the water and exhaust gases combine and are cleaned and scrubbed in the barrel segment,
    e) the nozzle including an exit end from which the combined water and exhaust gases are introduced into the water in the tank, and
    f) a secondary stack connected to the tank at a location downstream from the exit end of the nozzle whereby the exhaust gases are mixed with the water to create a combined mixture, a turbulent cleaning and scrubbing of the mixture occurs in the barrel segment and the combined mixture is dispersed from the nozzle into the water tank.

2. The exhaust gases and particulate capture system of claim 1 wherein the water tank is generally rectangular in cross-section and the aspirator unit is mounted at one end of the tank.

3. The exhaust gases and particulate capture system of claim 1 wherein the secondary stack comprises:
    a) a quiescent chamber in fluid communication with the water in the tank,
    b) a middle section containing a mist eliminator, and
    c) an upper section open to the atmosphere for exhausting the exhaust gases after they have been cleaned and scrubbed.

4. The exhaust gases and particulate capture system of claim 3 wherein the middle section also contains a fluid sprinkler for adding water to the tank and for backflushing the mist eliminator.

5. The exhaust gases and particulate capture system of claim 3 wherein the quiescent chamber, the middle section and the upper section are each generally cylindrical in cross-section.

6. The exhaust gases and particulate capture system of claim 1 wherein the nozzle comprises an entrainment nozzle for dispensing exhaust gases mixed with water into the tank below the surface of the water in the tank.

7. The exhaust gases and particulate capture system of claim 6 wherein the entrainment nozzle includes a first and second beveled section at the exit end of the entrainment nozzle to provide for an oscillating, side-to-side fanning motion of the mixture as it exits the entrainment nozzle.

8. The exhaust gases and particulate capture system of claim 6 wherein the entrainment nozzle includes at least one aperture positioned in the entrainment nozzle prior to the exit end of the entrainment nozzle to increase the mixing efficiency of the water with the exhaust gases.

9. The exhaust gases and particulate capture system of claim 6 further including a deceleration baffle disposed between the entrainment nozzle and the secondary stack.

10. The exhaust gases and particulate capture system of claim 9 wherein the deceleration baffle is generally V-shaped with the point of the V facing the entrainment nozzle.

11. The exhaust gases and particulate capture system of claim 6 further including a skimmer baffle disposed in the surface of the water in the tank between the entrainment nozzle and the secondary stack.

12. The exhaust gases and particulate capture system of claim 1 wherein the pump comprises a centrifugal pump for removing water from the tank and introducing the water into entrance opening of the aspirator unit.

13. The exhaust gases and particulate capture system of claim 10 wherein an electric motor powers the centrifugal pump.

14. The exhaust gases and particulate capture system of claim 1 wherein the water tank is a closed tank so that a positive air pressure can be maintained over the level of the water surface whereby particulates are prevented from escaping through the water surface.

15. A exhaust gases and particulate capture system comprising
   a) a tank containing water,
   b) an aspirator unit mounted to the tank, the aspirator unit including an entrance opening, a mixing chamber, a barrel segment and an entrainment nozzle,
   c) a pump attached to the water tank and to the entrance opening of the aspirator unit for introducing water from the water tank into the mixing unit of the aspirator unit,
   d) exhaust gases intake lines connected to the mixing chamber of the aspirator unit for bringing exhaust gases from a smokestack to the aspirator unit whereby the water and exhaust gases combine and are cleaned and scrubbed in the barrel segment,
   e) the nozzle including an exit end from which the combined water and exhaust gases are introduced into the water in the tank, and
   f) a secondary stack connected to the tank, the secondary stack comprising
      1) a quiescent chamber in fluid communication with the water in the tank,
      2) a middle section containing a mist eliminator, and
      3) an upper section open to the atmosphere for exhausting the exhaust gases,
   g) a deceleration baffle disposed between the entrainment nozzle and the secondary stack, and
   h) a skimmer baffle disposed in the surface of the water in the tank between the entrainment nozzle and the secondary stack
   whereby the exhaust gases are mixed with the water to create a combined mixture, a turbulent cleaning and scrubbing of the mixture occurs in the barrel segment, the combined mixture is dispersed from the entrainment nozzle into the water tank, the deceleration baffle slows the flow of the combined mixture toward the secondary stack, the skimmer baffle effects a wave reduction in the surface of the water and redirects particulate matter back into the water tank and the secondary stack effects a final treatment of the exhaust gases before they are released to the atmosphere.

16. The exhaust gases and particulate capture system of claim 15 wherein the water tank is generally rectangular in cross-section and the aspirator unit is mounted at one end of the tank.

17. The exhaust gases and particulate capture system of claim 15 wherein the middle section of the secondary stack also contains a fluid sprinkler for adding water to the tank and for backflushing the mist eliminator.

18. The exhaust gases and particulate capture system of claim 15 wherein the entrainment nozzle includes a first and second beveled section at the exit end of the entrainment nozzle to provide for an oscillating, side-to-side fanning motion of the mixture as it exits the entrainment nozzle.

19. The exhaust gases and particulate capture system of claim 15 wherein the entrainment nozzle includes at least one aperture positioned in the entrainment nozzle prior to the exit end of the entrainment nozzle to increase the mixing efficiency of the water with the exhaust gases.

20. The exhaust gases and particulate capture system of claim 15 wherein the deceleration baffle is generally V-shaped with the point of the V facing the entrainment nozzle.

* * * * *